United States Patent [19]

Person et al.

[11] Patent Number: 5,563,622
[45] Date of Patent: Oct. 8, 1996

[54] VACUUM FLUORESCENT DISPLAY TRI-COMPATIBLE DIMMING

[75] Inventors: Andrew P. Person; James P. Muccioli, both of Farmington Hills, Mich.

[73] Assignee: Chrysler Corporation, Auburn Hills, Mich.

[21] Appl. No.: 245,121

[22] Filed: May 17, 1994

[51] Int. Cl.⁶ .................................................. G09G 3/22
[52] U.S. Cl. ........................... 345/75; 345/214; 315/291
[58] Field of Search ................................ 345/47, 75, 74, 345/204, 214, 215; 315/169.3, 77, 157, 291, 308; 364/424.05, 308

[56] References Cited

U.S. PATENT DOCUMENTS

| | | | |
|---|---|---|---|
| 4,278,917 | 7/1981 | Kobori | 345/47 |
| 4,719,389 | 1/1988 | Miesterfeld | 345/75 |
| 4,845,619 | 7/1989 | Steely et al. | 364/424.05 |
| 4,859,912 | 8/1989 | Lippmann et al. | 315/169.3 |
| 4,968,917 | 11/1990 | Harris | 315/77 |
| 5,019,747 | 5/1991 | Morita | 315/157 |
| 5,081,451 | 1/1992 | Takekawa et al. | 345/75 |
| 5,099,178 | 3/1992 | Bozzer et al. | 345/47 |
| 5,162,789 | 11/1992 | Moriya et al. | 345/75 |
| 5,202,668 | 4/1993 | Nagami | 345/75 |
| 5,339,009 | 8/1994 | Lai | 315/291 |
| 5,381,074 | 1/1995 | Rudzewicz et al. | 315/308 |

Primary Examiner—Steven Saras
Attorney, Agent, or Firm—Christopher A. Taravella

[57] ABSTRACT

In a vacuum fluorescent display tri-compatible dimming system, a dimming signal can be sent in the form of a multiplex bus message, an analog DC voltage signal, or a pulse width modulated signal. Each form of dimming is accepted by a microprocessor of a lighted automotive module, such as a radio, however, the multiplex bus message takes priority. The microprocessor then sends a dimming signal to the vacuum fluorescent display via a vacuum fluorescent display driver IC.

5 Claims, 2 Drawing Sheets

VACUUM FLUORESCENT DISPLAY TRI-COMPATIBLE DIMMING

BACKGROUND OF THE INVENTION

1. Field of the Invention

The present invention relates to dimming control of a typical automotive module utilizing a vacuum fluorescent display. More particularly, the present invention relates to dimming of a module capable of utilizing three different types of dimming control methods.

2. Background Art

Nighttime dimming control of a typical automotive module (e.g., radio, instrument cluster, etc.) utilizing a vacuum fluorescent display (VFD) has been accomplished in a module in one of three methods. The first type of dimming control is that of analog DC voltage. A DC control voltage applied to a radio dimming input VFD driver IC will generate a VFD driving voltage proportional to the input voltage.

A second type of dimming control is pulse width modulation (PWM). A PWM dimming module varies the pulse width and hence the duty cycle of a waveform applied to a radio dimming input. The voltage input to the input control port of a VFD driver IC will generate the VFD driving voltage based on a prearranged VFD duty cycle ratio.

A third type of dimming control is accomplished using predetermined formatted multiplex bus messages. A dimming command is sent to a module over a multiplex bus. In response to the bus message, a module dims the VFD depending on the predetermined intensity for a given message.

Analog DC voltage dimming and PWM dimming have been accomplished in the same module and are known in the art. However, no module has been designed to be simultaneously compatible with all three dimming methods.

SUMMARY OF THE INVENTION

An object of the present invention is to provide a dimming system of an automotive module that can be used in various vehicles with different dimming systems or can be used in vehicles with a mixed dimming system.

In order to achieve the above object, there is provided a multiplex bus that is connected to a module. The multiplex bus, which reduces wiring interconnects and improves reliability in a diagnostic system, couples communicating microprocessors in modules, including a body computer, and other functional components of an automobile.

The module includes a microprocessor connected to the multiplex bus and to other circuits that provide analog and PWM dimming. The microprocessor is connected to a VFD driver integrated circuit (IC) which is, in turn, connected to a VFD display.

The microprocessor is configured to accept analog, PWM and multiplex bus message dimming inputs. The microprocessor is configured to default to analog or PWM dimming. Upon initialization, if a multiplex bus dimming message is received by the microprocessor, the microprocessor switches to multiplex bus dimming and disables the analog or PWM dimming input.

BRIEF DESCRIPTION OF THE DRAWINGS

Other objects, features and advantages of the present invention will become more fully apparent from the following detailed description of the preferred embodiment, the appended claims and in the accompanying drawings in which:

DETAILED DESCRIPTION OF THE PREFERRED EMBODIMENTS

Figure 1:
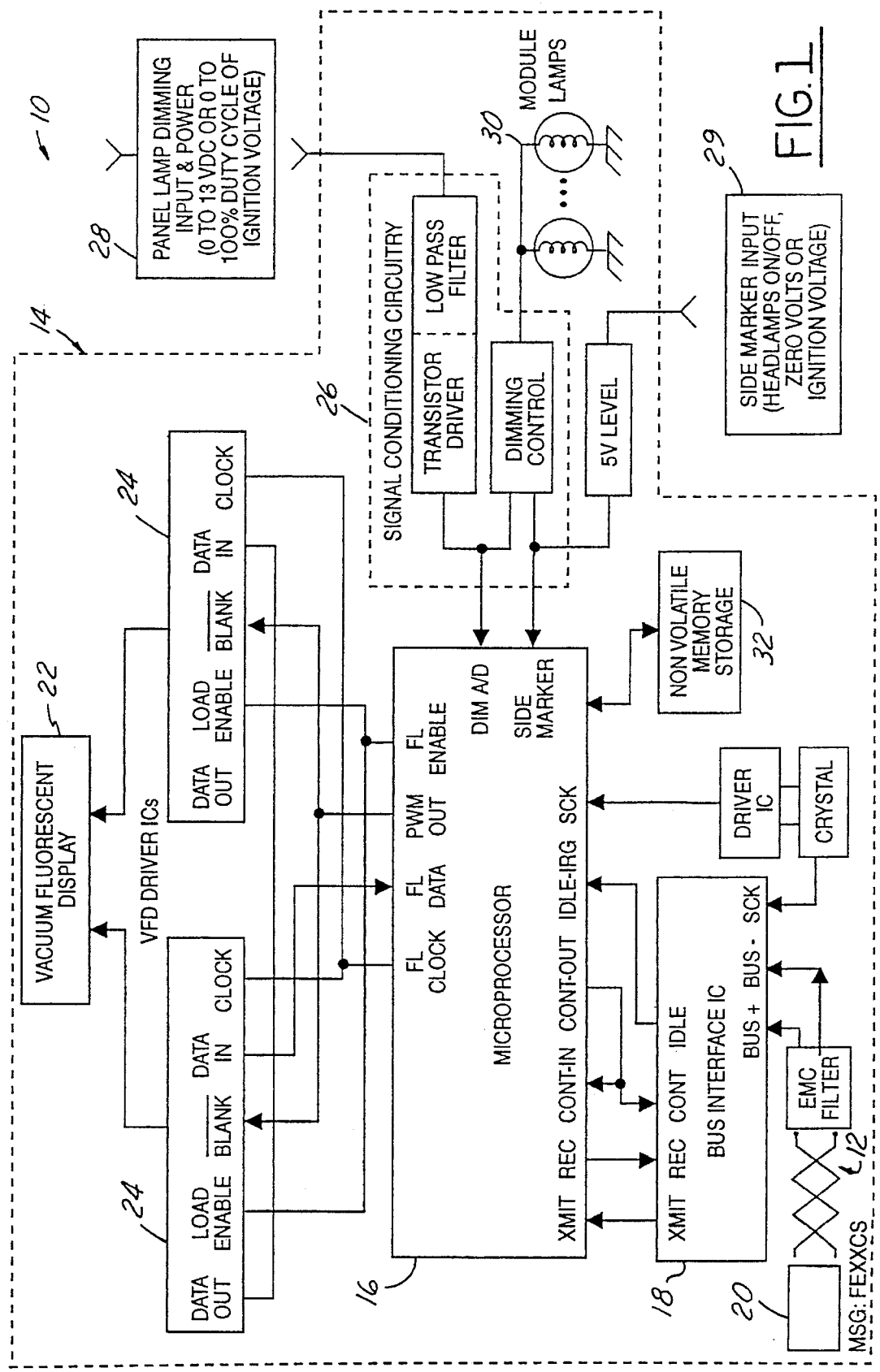
FIG. 1 is a block diagram of a tri-compatible dimming system in a radio connected to a multiplex bus in accordance with the teachings of the preferred embodiment of this invention.

Referring now to the drawings wherein like reference numerals are used to identify identical components in various views, FIG. 1 is a block diagram depicting an electronic network employing the tri-compatible dimming system 10 of the present invention. The network is contained within a vehicle (not shown). Extending throughout the vehicle is a multiplex bus 12 which functions to control and monitor functional components of the automobile for purposes other than to accomplish the objects of the present invention, but which may be utilized for such purposes.

The vacuum fluorescent tri-compatible dimming system 10 for purposes of the present invention includes the multiplex bus 12. As a part of the tri-compatible dimming system 10, the bus 12 is coupled to an automotive module, such as a radio 14. The radio 14 may have such standard features as AM and FM bands and tape and CD players.

The radio 14 has a microprocessor 16 capable of receiving and transmitting bus messages by way of a communication protocol having a predetermined format. The multiplex bus 12 preferably uses differential two wire twisted pairs of a style known to those of ordinary skill in the automotive electrical arts so that standard automotive connectors and automotive modules may be used and standard automotive assembly plant procedures may be maintained.

A bus interface IC 18 may be required to allow a bus message input 20 to be communicated between the microprocessor 16 of radio 14 and other components of the vehicle.

The radio 14 also has a vacuum fluorescent (VF) display 22 coupled to a vacuum fluorescent (VF) driver ICs 24 which is, in turn, coupled to microprocessor 16. VF driver ICs 24 controls the brightness of VF display 22 via microprocessor 16.

Also coupled to the microprocessor 16, is signal conditioning circuitry 26, typically consisting of a Low Pass Filter (LPF) and Transistor Driver Circuitry, capable of accepting an input 28 either in the form of a pulse width modulated signal or an analog DC voltage signal. Such signal conditioning circuitry 26 is known in the art. Input 28 is the instrument panel lamp dimming input signal from the vehicle. Input 29 is from the side marker or headlamp input signal of the vehicle. After the input 28 is processed by the signal conditioning circuitry 26, an average DC voltage is determined. This average DC voltage is applied to the incandescent bulbs 30, providing that there is an input 29 from the vehicle side marker signal. This average DC voltage is also input to the microprocessor 16 dimming voltage Analog to Digital converter (DIM A/D), which converts the dimming voltage into steps having increments of zero to 255. Microprocessor 16 then formulates a pulse width modulated output (PWM OUT) depending on a predetermined relationship to drive the BLANK inputs of the VF Driver ICs 24. Consequently, both VF Driver ICs 24 will change the brightness level of the VF Display 22 by referring to the BLANK input. An example of a strategy which may be used to program microprocessor 16 follows.

Assume that microprocessor 16 has a pulse width modulation output having the following characteristics:

Minimum Pulse Signal: Frequency =5.88 kHz,

Base step =1/255, and

Pulse width =666 ns (0.39% duty).

Further assume that the minimum pulse width is the reference unit as step change.

The Multiplex bus message for dimming is in the format of FE XX CS. Where byte FE is the message identification, byte XX is the required brightness level, and byte CS is the check sum. Values of $ follow the following scheme:

$XX =255 for full day time brightness;

254 for funeral mode brightness (same as daytime); and zero to 253 for 0% to 100% of night time brightness.

The PWD dimming input is typically zero to 100% duty cycle of the vehicle Ignition circuit voltage.

The Analog dimming input typically varies from zero VDC to Ignition voltage.

TABLE 1

DIMMING CONTROL WITH MULTIPLEX BUS & PWD/ANALOG

| Vehicle MULTIPLEX BUS INPUT CCD Dimming (HEX) | Module uCOM PWM OUT PWM STEP # | Vehicle Dimming ANALOG/PWD INPUT DIMMING A/D (HEX) | Module uCOM PWM OUT PWM STEP # |
|---|---|---|---|
| FD | F7 | 31 | FF | FE | 35 |
| F6 | F0 | 30 | FD | FC | 34 |
| EF | E9 | 29 | FB | FA | 33 |
| E8 | E2 | 28 | F9 | F8 | 32 |
| E1 | DB | 27 | F7 | F6 | 31 |
| DA | D4 | 26 | F5 | F4 | 30 |
| D3 | CD | 25 | F3 | F2 | 29 |
| CC | C6 | 24 | F1 | F0 | 28 |
| C5 | BF | 23 | EF | EE | 27 |
| BE | B8 | 22 | ED | EC | 26 |
| B7 | B1 | 21 | EB | EA | 25 |
| B0 | AA | 21 | E9 | E8 | 24 |
| A9 | A3 | 20 | E7 | E6 | 23 |
| A2 | 9C | 19 | E5 | E4 | 22 |
| 9B | 95 | 18 | E3 | E2 | 21 |
| 94 | 8E | 17 | E1 | E0 | 20 |
| 8D | 87 | 16 | DF | DE | 19 |
| 86 | 80 | 15 | DD | DC | 18 |
| 7F | 79 | 14 | DB | DA | 17 |
| 78 | 72 | 13 | D9 | D8 | 16 |
| 71 | 6B | 12 | D7 | D6 | 15 |
| 6A | 64 | 11 | D5 | D4 | 14 |
| 64 | 5D | 10 | D3 | CC | 13 |
| 5C | 56 | 9 | CB | C4 | 12 |
| 55 | 4F | 8 | C3 | BC | 11 |
| 4E | 48 | 8 | BB | B4 | 10 |
| 47 | 4 | 7 | B3 | AC | 9 |
| 40 | 3A | 6 | AB | A4 | 8 |
| 39 | 33 | 5 | A3 | 9C | 7 |
| 32 | 2C | 4 | 9B | 94 | 6 |
| 2B | 25 | 3 | 93 | 8C | 5 |
| 24 | 1E | 3 | 8B | 84 | 4 |
| 1D | 17 | 2 | 83 | 7C | 3 |
| 16 --- | 00 | 1 | 7B ---- | 00 | 2 |

The BLANK input port is internally pulled up in both VF driver ICs 24. If pulled to ground by microprocessor 16, then the VF display 22 segments are off (blanked). If the BLANK input of VF driver ICs 24 is driven by a pulsed dc wave, then the brightness of the connected VF 22 segments will vary depending on the duty cycle. The microprocessor 16 drives the BLANK input of both VF driver ICs 24 with a pulsed dc wave by way of the Pulse Width Modulated Output (PWM OUT) of microprocessor 16. Microprocessor 16 also provides the data (FL-data) to determine which VF segments are ON or OFF, as well as the CLOCK signal (FL-CLOCK), and LOAD ENABLE (FL-ENABLE) to the VF driver ICs 24.

Also, microprocessor 16 reads the VFD dimming code of multiplex bus message 20 through multiplex bus IC 18. The microprocessor 16 converts the multiplex bus message 20 digital byte dimming codes into a Pulse Width Modulation Output (PWD OUT) according to a predetermined table (as an example, see Table 1). The PWM OUT signal of the microprocessor 16 is applied to the BLANK input of the VF Driver ICs 24 to change the brightness of the VF Display 22.

In the normal course of operation, microprocessor 16 accepts input 26. However, if a bus message input 20 is received it is given priority and input 26 is disabled. The disabling of input 26 can be achieved using an external relay (not shown) or through internal programming of microprocessor 16.

A non-volatile memory storage 32 (typically EEPROM) may be coupled to microprocessor 16 so that the applicable dimming method can be confirmed upon initialization of microprocessor 16 or ignition reset.

Figure 2:
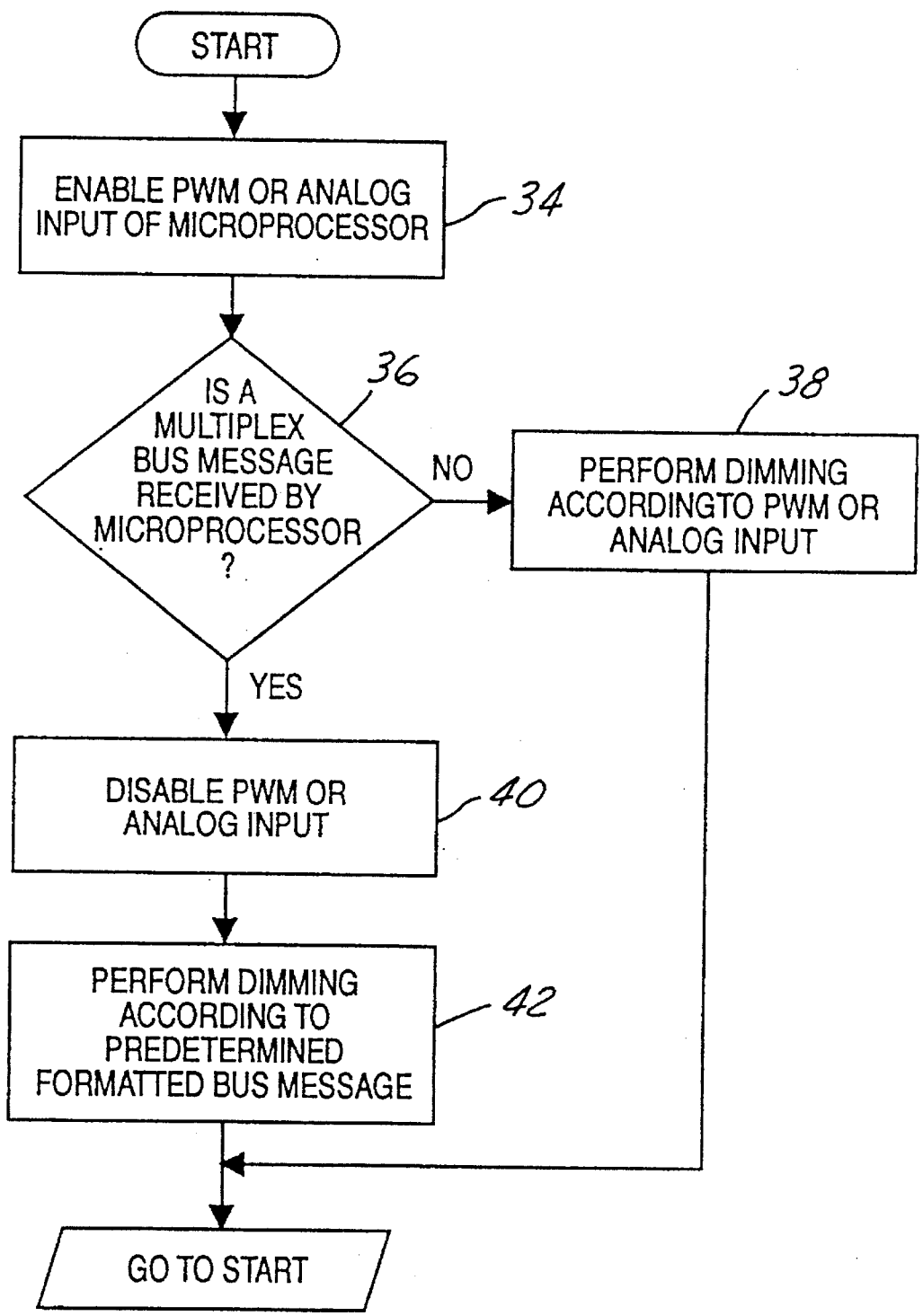
FIG. 2 is a flow chart illustrating the general sequence of steps associated with the operation of the system found in FIG. 1.

The general sequence of steps associated with the operation of the present invention is illustrated in FIG. 2. Initially, the PWM or analog input of the microprocessor 16 is enabled, as shown in step 34. As illustrated in steps 36 and 38, if a multiplex bus message is not received by the microprocessor 16, dimming is performed according to PWM or analog input. However, if a multiplex bus message is received by microprocessor 16, microprocessor 16 disables the PWM or analog input, as shown in step 40. Accordingly, dimming is controlled according to predetermined formatted multiplex bus messages, as shown in step 42.

While the present invention has been disclosed with the preferred embodiment thereof, it should be understood that there may be other embodiments which fall within the spirit and scope of the invention and that the invention is susceptible to modification, variation and change without departing from the proper scope or fair meaning of the following claims.

What is claimed is:

1. A dimming system compatible with pulse width modulation, analog DC voltage and multiplex bus message dimming controls for vacuum fluorescent displays of modules in a vehicle having a multiplex bus system, comprising:

signal conditioning circuitry means for accepting pulse width modulated signals and analog DC voltage signals and for generating a first dimming signal, said first dimming signal being of a first type;

multiplex bus means for transmitting a second dimming signal, said second dimming signal being of a second type different from said first type;

microprocessor means coupled to said signal conditioning circuitry means and said multiplex bus means for receiving said first dimming signal and said second dimming signal, said microprocessor means accepting one of said first or second dimming signal in accordance with a predetermined strategy and disabling the other one of said first and second dimming signals, and thereafter generating a third dimming signal according to said accepted one of said first and second dimming signals; and vacuum fluorescent display means coupled to said microprocessor means for receiving said third dimming signal and dimming said vacuum fluorescent display in response thereto.

2. A dimming system as recited in claim 1, further comprising a storage means coupled to said microprocessor means for storing said accepted first or second dimming signal.

3. A dimming system as recited in claim 1, wherein said microprocessor means disables one of said first or second dimming signal external to said microprocessor means.

4. A dimming module configured to accept analog DC, pulse width modulated and multiplex bus message dimming controls for dimming a vacuum fluorescent display, comprising:

a signal conditioner responsive to pulse width modulated and analog DC voltage signals for generating a first dimming signal, said first dimming signal being of a first type;

a multiplex bus for transmitting multiplex bus messages, said message defining a second dimming signal, said second dimming signal being of a second type different from said first type;

a microprocessor responsive to said first and second dimming signals for generating a third dimming signal indicative of a dimming level of said vacuum fluorescent display, said microprocessor being operative to select one of said first and second dimming signals according to a predetermined strategy and to disable the other one, said microprocessor generating said third dimming signal as a function of said selected one dimming signal.

5. The dimming module of claim 4 wherein said microprocessor receives said first dimming signal at a first location on said microprocessor and said microprocessor receives said second dimming signal at a second location on said microprocessor, said second location being spaced from said first location.

\* \* \* \* \*